April 8, 1969  D. GABOR ET AL  3,437,865
THERMIONIC ELECTRON EMITTER HAVING A POROUS REFRACTORY METAL
MATRIX AND AN ALLOY OF ACTIVE METAL AND
MOBILIZER METAL THEREIN
Filed Dec. 13, 1965
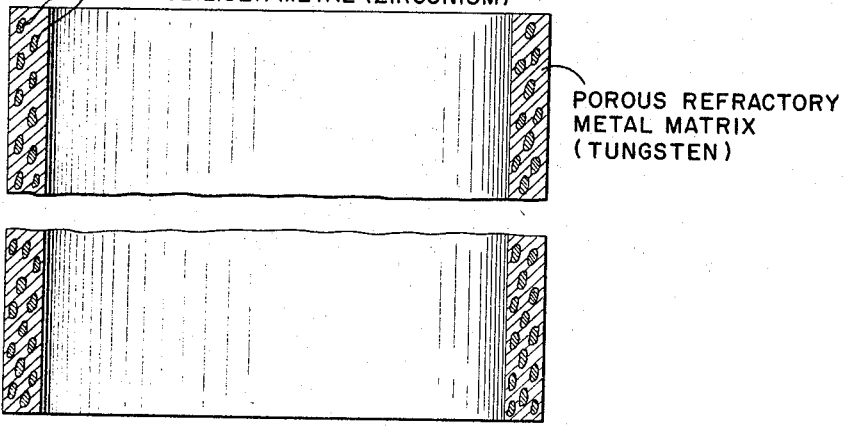
INVENTORS
D. GABOR
M.J. ALBERT
BY Cameron, Kerkam & Sutton
ATTORNEYS

United States Patent Office 3,437,865
Patented Apr. 8, 1969

3,437,865
THERMIONIC ELECTRON EMITTER HAVING A POROUS REFRACTORY METAL MATRIX AND AN ALLOY OF ACTIVE METAL AND MOBILIZER METAL THEREIN
Dennis Gabor, London, and Michael Joseph Albert, Harlow, England, assignors to National Research Development Corporation, London, England, a British company
Filed Dec. 13, 1965, Ser. No. 513,523
Claims priority, application Great Britain, Dec. 23, 1964, 52,228/64
Int. Cl. H01j 1/14
U.S. Cl. 313—346          6 Claims

ABSTRACT OF THE DISCLOSURE

A thermionic emitter, particularly suitable for operation at high emission densities, comprises a porous matrix formed of a refractory metal, emissive material comprising an active metal which is in the elemental state, and is such that it does not alloy with the refractory metal but is capable of being atomically adsorbed on the surface thereof to provide an electron emissive layer, and a mobiliser metal having at least partial solubility in the active metal and whose alloy with the active metal wets the refractory metal, at least in the molten state. The cathode thus formed does not contain oxides or other compounds of the metallic elements which would tend to reduce electrical conduction and heat conduction to an emissive surface.

---

This invention relates to thermionic emitters, more particularly to electron emitters suitable for operation at high emission densities, such as are required in thermionic generators, and in other electronic devices.

Hitherto thermionic electron emitters have included compounds of metallic and non-metallic elements, for example, the oxides, borides and carbides of metals. The non-metallic compounds in such emitters tend to reduce the electrical conduction and the heat conduction to the emissive surface.

The present invention is based on the discovery that a satisfactory electron emitter can be formed with certain metals alone, without the inclusion of appreciable amounts of compounds of these metals with non-metallic elements.

A thermionic electron emitter in accordance with the invention comprises three metallic materials, namely, a porous matrix formed of a refractory metal, metallic material (to be called the active metal) which does not alloy with the refractory metal but which is capable of being atomically adsorbed on its surface to provide an electron emissive layer, and further metallic material (to be called a mobiliser) which has at least partial solubility in the active metal and whose alloy with the active metal wets the refractory metal, at least in the molten state.

Examples of refractory metals suitable for the matrix are tungsten, tantalum, molybdenum, rhenium and iridium, and their alloys with one another.

Examples of suitable active metals having good electron emissive properties as adatoms on a refractory metal surface are the rare earth metals in the atomic series extending from lanthanum to lutetium, inclusive, and the similar elements yttrium and thorium. When atomic layers of these metals are adsorbed on the surface of a refractory metal such as tungsten, they have work functions in the range of 2.3 to 2.7 volts and therefore will produce good electron emission provided that they cover an appreciable fraction of the surface of the refractory metal. However when these active metals are embodied by themselves in a porous matrix of a refractory metal, it is found that only poor coverages of the order of 0.01 or less are obtained.

The mobiliser is preferably a metal which has low vapour pressure at the operating temperatures. Examples of suitable mobilisers are titanium, zirconium and hafnium in group IV of the periodic system, vanadium, chromium manganese, iron, cobalt and nickel in the first sub-period of period 4 of the periodic system, and the metals of the platinum sub-group. It has also been found that one rare earth metal can act as a mobiliser for another, for instance lanthanum for thorium.

The drawing illustrates diagrammatically one embodiment of the invention.

Emitters embodying the invention can be produced in various ways. One method is to mix all three types of metals in powder form, press them into the required shape, and sinter the pressing in vacuo or in a non-oxidising atmosphere until it acquires sufficient strength to be handled. A certain difficulty arises from the fact that several of the rare earth metals, in particular lanthanum and cerium, are pyrophoric when in the form of fine powders, so that the preparation must be done under a protective liquid, such as boiled paraffin oil, and the emitter must not be exposed to air for more than a few hours.

In a second method an alloy of the emitter material with the mobiliser is produced first by melting under vacuum, or in a non-oxidising atmosphere, and the ingot thus formed is then comminuted either mechanically, by filing or grinding, or by sputtering in an electric arc under a protective liquid. If the mobiliser is titanium or zirconium, the alloy will not be much more resistant to oxidation than the rare earth metal by itself, hence the above mentioned precautions are still necessary. On the other hand if the mobiliser is a metal of the first sub-period of the fourth period of the periodic system, such as, for example, nickel, or a platinum metal, such precautions are not necessary as these metals very efficiently protect the rare earth metals from oxidation. Moreover the pressings have much higher mechanical strength after sintering than those in which the mobiliser is titanium or zirconium.

In a third method a porous refractory body, for instance of tungsten, is first prepared by any of the methods known in the art, and this is then soaked under vacuum in the melt of an alloy of the emitting material with the mobiliser. This method also gives bodies of higher mechanical strength; moreover the emitters thus prepared resist oxidation much better, as the pores are almost completely filled and the air cannot penetrate much below the surface.

In a fourth method, a mixture of the three types of metals in powder form is sprayed with a plasma torch or the like on a refractory metal foundation, in a protective atmosphere.

It is also advantageous to add to the metal mixture a small quantity of aluminium or a similar metal which has the property of forming a coherent refractory oxide layer. This has the advantage that the alloy of the highly oxidisable metals can be handled in air without excessive precautions, and it is also advantageous in the operation, as will be explained later.

An advantage of emitters embodying the invention is that no substantial layer of non-metallic compounds is formed on the surface of the refractory metal which might reduce the electrical conduction and the heat conduction to the surface. This is particularly important in high density emitters, such as are required, for instance, in thermionic generators, in which cooling by electron emission can become important, and can even exceed the cooling by radiation.

Typical suitable thicknesses of an emitter according to the invention range from 0.020″ to 0.080″. For electron-optical devices such as cathode ray tubes or electron microscopes, the emitter may be made in the shape of a rod of, for instance, 0.040″–0.060″ diameter. For microwave tubes and also for thermionic generators with plane geometry, the emitter may have the shape of a disc with, for instance, a 1″ diameter. For thermionic generators with cylindrical geometry and also for large transmitter valves, a preferable shape is a hollow cylinder of ½″ to 1½″ diameter. Either the external or the internal surface can be used as the emitting surface. In any case, the depth as stated is sufficient to supply active material for operations at least comparable with already known emitters.

The metallic emitters according to the invention have emission characteristics with clean cut saturation, unlike oxide cathodes which display an anomalous field effect, such that at a field gradient of a few hundred volts per centimeter their field emission can exceed the zero field emission by a factor of three or more. This is evidence of the monatomic nature of the emissive layer.

As an example of the improved performance obtained by the invention the performance of an emitter comprising a tungsten matrix in which was embodied 8% of lanthanum metal and which was heated to 1500° C. may be compared: (1) without the addition of any mobiliser; (2) with the addition of 2% zirconium in the metallic form or in the form of zirconium hydride which dissociates with the operating temperature, and (3) with the addition of 4% of zirconium. Measurements were made of the emission current density and also of the amount of evaporated material. This last mentioned quantity was measured by placing a cooled metal electrode in front of the emitter and weighing this before and after the experiment. From these results a figure of merit representing the ratio of electric charge emitted, measured in coulombs, to the evaported material, measured in milligrams, was constructed. This is a useful figure of merit for emitters which have to supply heavy currents for long times and has the advantage that it is only little dependent on the temperature at which the emitter is operated because the electron emission and the evaporation rate increase almost in the same proportion with temperature.

| Emitter | Figure of merit (coulombs/mg.) | Current density (amp/cm.$^2$) |
| --- | --- | --- |
| (1) 0.92 W, 0.08 La | 400 | 0.4 |
| (2) 0.90 W, 0.08 La, 0.02 Zr | 12,000 | 2.4 |
| (3) 0.88 W, 0.08 La, 0.04 Zr | 14,000 | 3.2 |

These figures have been found in vacuo. In the presence of a gas or vapour, as in a thermionic generator, the emission remains the same but the evaporation is much reduced because the major part of the evaporated atoms return to the emitter by collisions with gas molecules before they reach the collector, hence the quoted figures of merit are increased by a large factor.

One interpretation of the striking results that are obtained in examples (2) and (3) in comparison with example (1) in which no mobiliser is used, is as follows, it being understood that this interpretation is put forward purely as a tentative explanation and is not to be taken as limiting the scope of the invention in any way. The work function of the emitter, obtained from a Richardson plot, was the same in all cases, very nearly 2.40 volts, hence it is reasonable to assume that the emission came from lanthanum adatoms on a tungsten surface, and there is no evidence that zirconium spreads on the surface. The increased emission is therefore a consequence of a 6–8 fold increase of the coverage and a 6–8 fold increase of supply of lanthanum adatoms to the surface. This increase is the effect of the mobiliser. Lanthanum, like all the rare earth metals, does not alloy with tungsten, and when molten does not wet it. Consequently the lanthanum in the tungsten pores forms droplets, and the supply of lanthanum atoms to the surface is only through evaporation, condensation in the pore channels and slow spreading towards the surface. On the other hand zirconium has partial solubility in lanthanum, and the molten alloy wets the tungsten surface. Consequently it has a tendency to rise to the surface through the narrow pore channels, and forms a sharp-edged meniscus. One interpretation is that lanthanum atoms escape from this sharp edge, because the free energy of the condensation of the lanthanum adatom on a tungsten surface considerably exceeds the free energy of removing a lanthanum atom from the lanthanum-zirconium melt. This is a tentative explanation of the increased emission.

The reduced rate of evaporation is to a small part explained by the well known effect of reduction of vapour pressure at a concave liquid surface. It is further reduced by depletion of the top layer of the liquid alloy of lanthanum, owing to the sideways escape of lanthanum atoms. There is also probably a third, and more important cause, in the formation of a layer of the oxides of lanthanum and/or zirconium on the liquid surface. A very small fraction of oxide is sufficient to form a protective layer, which greatly reduces the evaporation. It appears that this small amount of oxide is retained in the meniscus, and does not spread over the tungsten surface.

The cohesion of the oxide layer is greatly enhanced by a small addition of aluminium. Though the aluminium mostly evaporates during operation, its refractory oxide remains behind as permanent protection of the alloy surface in the pores. The oxide forms a negligible proportion of the emitter and is a purely protection layer, playing no part in the emission process.

It follows from this theory that in order to obtain good emission and low evaporation, the pores must be numerous but small. This agrees with the observations that thick condensates of metal on a coated metal plate facing the emitter were found opposite pores which were accidentally large, and that better results are obtained with a polished surface, in which the open pores were closed to such an extent that they were hardly visible under the miscroscope, than with rough emitter surfaces.

Emitters according to the invention are particularly suitable for thermionic generators whose emitters are heated with nuclear fuel, as they operate best in a temperature range for which no good emitters are at present available. For instance, emitters according to the invention with lanthanum as the active metal will operate with 3–10 amp/cm.$^2$ emission, while the corresponding range for the emitters in which thorium is the active metal, to be described below, is 1600–1750° C. Hitherto, the best known emitters for this temperature range were the carbides of uranium and zirconium, which had the disadvantage that in prolonged operation they deposited a non-conducting crust on the collector. On the other hand, the purely metallic emitters according to the invention deposit only a thin metal layer on the collector, which is a good conductor of heat and electricity. In order to lower the work function of this layer, a small proportion of earth alkali metals, such as barium, may be added to the emitters.

Examples of emitters embodying the invention in which the active metal is thorium are given below, together with their performance data at 1600° C.

| Emitter | Figure of merit | Current density (amp/cm.$^2$) |
| --- | --- | --- |
| (4) 0.90 W, 0.095 Th, 0.005 Zr | 2,100 coulomb/mg | 5.0 |
| (5) 0.90 W, 0.09 Th, 0.01 Hf | 8,300 coulomb/mg | 5.2 |
| (6) 0.90 W, 0.03 Th, 0.07 La | 1.6 million coulomb/mg | 5.0 |

These were all thorium emitters, as inferred from the fact that the Richardson work function was very nearly 2.7 volts in all cases, the same as in the conventional tungsten emitters activated with pure thorium or thoria. This is particularly remarkable in the case of example (6) in which the mobiliser was another rare earth metal, lanthanum. Though, at least initially, this emitter contained an excess of lanthanum, the work function was always 2.7 volts, clearly distinct from the 2.4 volts in the case of the lanthanum-active emitters (1), (2) and (3). It is also particularly remarkable that this emitter (6) had by far the highest figure of merit, in spite of the rather high volatility of lanthanum, which suggests that lanthanum and thorium form an alloy with an outstandingly stable protective oxide layer. Moreover, tungsten-thorium-lanthanum emitters gave more than ten times emission at given temperatures than the best figures claimed in the literature for tungsten-thorium emitters, which indicates that the proportion of the tungsten surface covered by thorium adatoms was more than ten times larger.

It is a further advantage of emitters according to the invention, that they are also suitable for demountable devices, as on heating they soon recover their activity, even after prolonged exposure to air.

In the foregoing examples the active, emitting constituents of the emitter were the rare earth metals, but it is within the scope of the invention to exend the application of a mobiliser also to cathodes with alkaline earth metals as emitters, thus extending the useful temperature range of emitters according to the invention downwards to 1000° C. or even less.

We claim:

1. A thermionic electron emitter comprising a porous matrix formed of a refractory metal, emissive material comprising an active metal selected from the group consisting of the rare earth metals, yttrium and thorium, said active metal being in the elemental state only, and such that it does not alloy with the said refractory metal but is capable of being atomically adsorbed on its surface to provide an electron emissive layer, and a mobiliser metallic material which has at least partial solubility in the active metal and whose alloy with the active metal wets the refractory metal, at least in the molten state.

2. The emitter as claimed in claim 1, in which the matrix is formed of at least one of the metals tungsten, tantalum, molybdenum, rhenium and iridium.

3. The emitter as claimed in claim 1, in which the mobiliser comprises at least one of the metals titanium, zirconium, hafnium, vanadium, chromium, manganese, iron, cobalt, nickel, ruthenium, rhodium, palladium and platinum.

4. The emitter as claimed in claim 1 in which the mobiliser comprises at least one of the aforesaid group of metals other than a metal constituting the active metal.

5. A thermionic electron emitter comprising a porous matrix formed of a refractory metal, an active metal in the elemental state only which does not alloy with the refractory metal but is capable of being atomically adsorbed on the surface thereof to provide an electron emissive layer, and a mobiliser metallic material having at least partial solubility in the active metal and whose alloy with the active metal wets the refractory metal, at least in the molten state.

6. A thermionic electron emitter comprising a porous matrix formed of a refractory metal, and an alloy of an active metal, which does not alloy with the refractory metal but is capable of being atomically adsorbed on the surface thereof to produce an electron emissive layer, and a mobiliser metal which has at least partial solubility in the active metal and whose alloy with the active metal wets the refractory metal, at least in the molten state, the matrix being formed of at least one metal of the group consisting of tungsten, tantalum, molybdenum, rhenium and iridium, the active metal comprising at least one metal of the group consisting of the rare earth metals, yttrium and thorium, and the mobiliser comprising at least one metal of the group consisting of titanium, zirconium, hafnium, vanadium, chromium, manganese, iron, cobalt, nickel, ruthenium, rhodium, palladium and platinum.

References Cited

UNITED STATES PATENTS

| | | | |
|---|---|---|---|
| 2,945,150 | 7/1960 | De Santis et al. | 313—346 |
| 3,155,864 | 11/1964 | Coppola | 313—337 X |
| 2,808,530 | 10/1957 | Katz | 313—346 |
| 2,808,531 | 10/1957 | Katz et al. | 313—346 |
| 2,925,514 | 2/1960 | Lemmens et al. | 313—346 |
| 3,159,461 | 12/1964 | MacNair | 313—346 X |
| 3,139,541 | 6/1964 | Henderson et al. | 313—346 X |

JOHN W. HUCKERT, *Primary Examiner.*

A. J. JAMES, *Assistant Examiner.*

U.S. Cl. X.R.

313—270, 345